United States Patent

Manna et al.

Patent Number: 6,146,674
Date of Patent: Nov. 14, 2000

[54] METHOD AND DEVICE FOR MANUFACTURING HOT DOGS USING HIGH POWER ULTRASOUND

[75] Inventors: Ronald R. Manna, Valley Stream; Alvin W. Russell, Hewlett Bay Park, both of N.Y.; Dan Voic, Clifton, N.J.; Theodore A. D. Novak, Kings Park, N.Y.; David Ng, Bayside, N.Y.; Salvatore Pantano, Farmingdale, N.Y.

[73] Assignee: Misonix Incorporated, Farmingdale, N.Y.

[21] Appl. No.: 09/320,897

[22] Filed: May 27, 1999

[51] Int. Cl.[7] ........................................ A23L 3/00
[52] U.S. Cl. ................ 426/238; 426/513; 426/516; 426/519; 99/451; 99/645; 99/DIG. 12
[58] Field of Search ...................... 426/238, 513, 426/516, 519; 99/451, DIG. 12, 645

[56] References Cited

U.S. PATENT DOCUMENTS

| | | | |
|---|---|---|---|
| 4,675,194 | 6/1987 | Gafney | 426/39 |
| 5,871,783 | 2/1999 | Capodieci | 425/174.2 |
| 5,871,793 | 2/1999 | Capodieci | 426/238 |
| 5,914,140 | 6/1999 | Kamper et al. | 426/89 |

FOREIGN PATENT DOCUMENTS

| | | |
|---|---|---|
| 200970 | 6/1983 | German Dem. Rep. . |
| 198 49 357 | 4/1999 | Germany . |

*Primary Examiner*—Nina Bhat
*Attorney, Agent, or Firm*—R. Neil Sudol; Henry D. Coleman

[57] ABSTRACT

An semi-solid mixture, such as a particulate meat mixture, is brought into contact with a vibrating surface, whereby energy is transported across the surface into the mixture. The vibration is generally contemplated to be in the ultrasonic frequency range, and the energy injection is contemplated to be sufficient to cause local physical and chemical changes in mixtures susceptible to such changes, and generally to cause changes in the direction of increased tensile strength and resistance to flow. In general a skin is formed on the mixture, and with greater processing efficiency then if such skin were formed by purely thermal means.

31 Claims, 11 Drawing Sheets

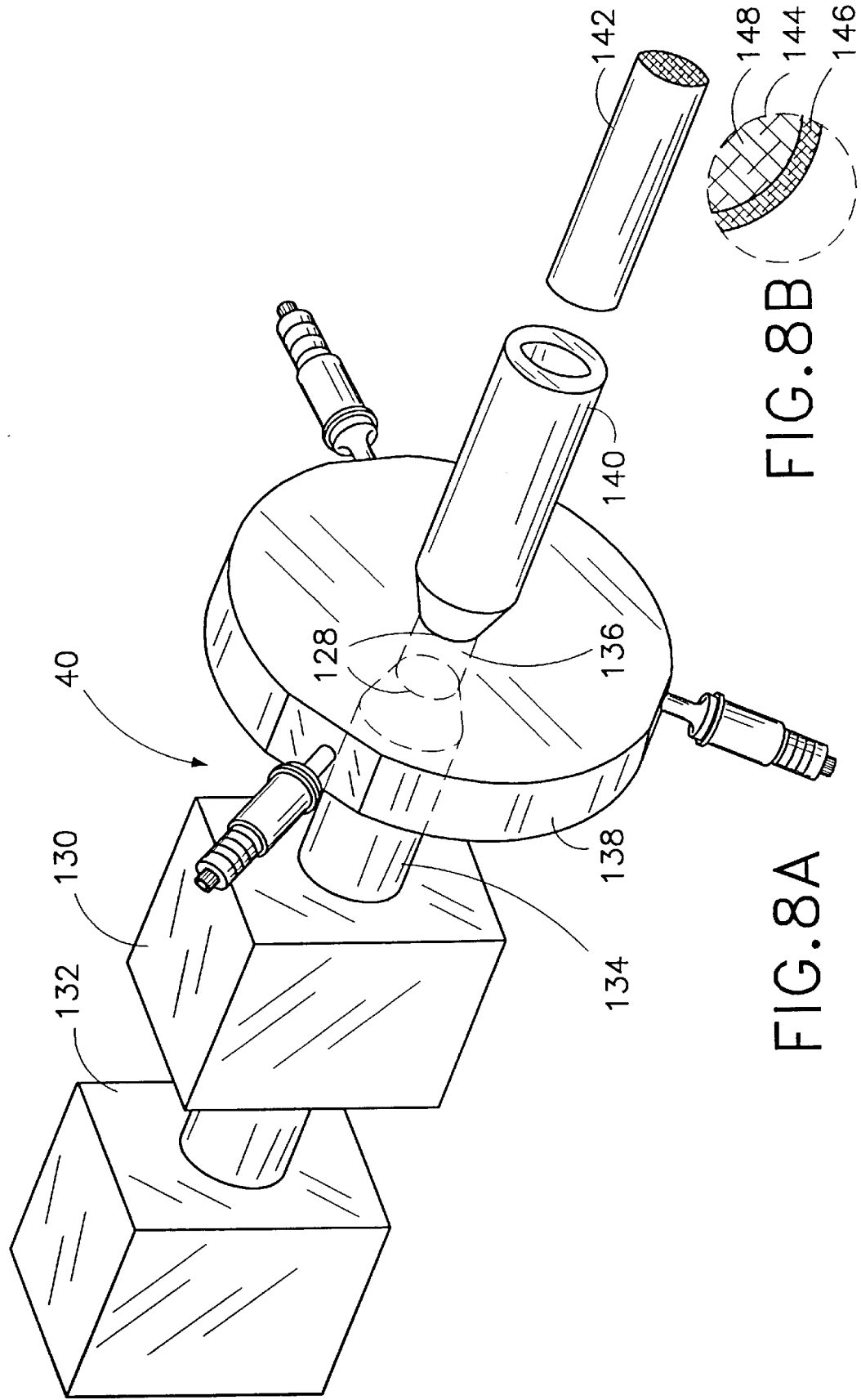

METHOD AND DEVICE FOR MANUFACTURING HOT DOGS USING HIGH POWER ULTRASOUND

BACKGROUND OF THE INVENTION

This invention relates to food production. More particularly this invention relates to a method and an associated apparatus for manufacturing a foodstuff such as a frankfurter or wurst.

In the United States food industry, cost containment is a major concern. With the sheer volume of goods produced each year, a fraction of a penny saved per pound or piece may translate into millions of dollars of additional income each year for meat packers or produce suppliers.

One example of this concept is in the manufacture of frankfurters, bratwurst or knockwurst. To manufacture these items, meat packers will chop and whip beef or other meat cuts such as chicken, turkey or pork. Spices will be added along with water, preservatives and coloring to the mix. The resulting semi-solid emulsion or particulate meat mixture will be extruded into a casing of either plastic or edible gut and formed into the familiar shape of a hot dog. After extruding and shaping, the product will be cooked fully so that the customer needs only to heat it thoroughly for final preparation.

Most households in the U.S. today prefer frankfurters to be skinless, that is, without a casing which must be removed before frankfurter consumption. In the preparation of skinless franks or wursts, the processor must remove the skin before final packaging in vacuum-sealed plastic bags. This process involves the physical stripping of the casing by hand or machine and discarding the used plastic wrap.

The cost of the plastic wrap, the personnel needed for stripping and the solid waste removal costs can be substantial. One facility has estimated a $5 million dollar per year revenue increase if this cost could be eliminated. And this estimate does not take the front office, purchasing and machinery capital costs into account.

However, simply eliminating the casing step is not possible because the hot dog must be formed and held together before and during the cooking step. Otherwise, the emulsion will not hold its shape and the product will be ruined. Therefore, a method of creating a stable shape and product containment during this handling must be found. This method must lend itself to high speed production techniques and not alter the taste and look of the product as well.

Although the concept of creating frankfurters or wursts without a casing has been well documented in prior art patents, most of these techniques have centered upon using standard heating platens or molds to create a skin on the product before final processing. These techniques have not been met with widespread acceptance since conductive or convective heat energy is expensive. When a platen is heated, much heat is lost to the surrounding environment or through conduction to the rest of the metallic apparatus. In addition, creating a skin by such methods is time consuming, thereby reducing the production throughput or requiring significant investment in capital equipment to keep output rates high. Accordingly, it would be advantageous to have a an efficient method of partial cooking or processing of hot dog feed stock, in order to form a skin thereon.

OBJECTS OF THE INVENTION

It is an object of this invention to provide a novel method of cooking at least a portion of a food product.

It is a further object of this invention to provide a novel method of cooking which permits the efficient injection of energy into a surface region of a cookable feedstuff.

It is a more particular object of this invention to provide a technique whereby sausage shaped portions of edible feedstuffs may be formed without use of plastic or gut casings.

It is a further object of this invention to provide several configurations of tooling which are able to process the outside of cylindrical product shapes to create a skin, which skin will have sufficient tensile strength to hold the shape of an item throughout final processing.

These and other objects of the present invention will be apparent from the drawings and descriptions herein.

BRIEF DESCRIPTION

The present invention is based on the observation that high power ultrasonic waves have various effects on mammalian tissue, whether living or dead. Depending upon the frequency and amplitude of vibration and the configuration of the ultrasonic tool, effects such as cutting, cavitation ablation and blood vessel coagulation have been noted.

When an ultrasonic tool is placed against the meat emulsion which comprises the frankfurter stuffing, it has been noted that a stiffening of the emulsion takes place. Since ultrasound waves below 100,000 Hz do not penetrate far into the tissue due to internal losses, the effect is contained to an area only several millimeters below the active surface. Therefore, it is possible to create an ultrasonic tool which will treat the surface of a cylindrical shape so that a skin is created. The skin resulting from ultrasonic treatment has sufficient tensile properties to hold the cylindrical shape during final processing. In the case of hot dog manufacture, the same basic meat formulations may be used as with other manufacturing methods. No plastic or gut casing is necessary.

Accordingly, the present invention is directed in part to a method which operates on a flowable mixture, such as a particulate meat mixture, by placing that mixture in contact with a surface and then vibrating the surface to transfer energy to the mixture. Preferably, the surface is vibrated at an ultrasonic frequency and transfers sufficient energy to the mixture to form a skin thereon.

Semi-solid or flowable mixtures contemplated as within the scope of possible feedstuffs or feed stocks for processing by the present invention include but are not limited to particulate meat mixtures, doughs, pastes and batters, and also possibly the feed stocks of industrial processes whose output, such as for example animal feed or fertilizer capsules, is not intended for human consumption. These feed stocks may all be characterized as capable of undergoing useful and irreversible physical and chemical changes upon the injection of energy. In the case of human foodstuffs, we describe the process of causing such useful and irreversible energetically mediated physical changes as "cooking." In addition to changes in the chemistry of the raw ingredients, cooking is often accompanied by a permanent change in physical state, typically in the direction of transformation of liquid or semi-solid or, generally, flowable precooked states, into non-flowable or solid post-cooked states, as is well known in the case of doughs, batters, and, in the principally described embodiment of the present invention, particulate meat mixtures capable of being formed into frankfurters or wursts.

The present invention, in providing a method for creating skins on particulate meat mixtures as a processing step in the production of frankfurters and wursts, thereby essentially provides an advantageous method of partially cooking the product. Accordingly, in its full generality, the present invention relates to a method of cooking. The invention is applicable to the processing of any mixture which may undergo useful chemical and physical changes upon energy injection, whether or not such mixture produces and edible end product. We will adopt the definition that mixtures of whatever composition which demonstrate this useful potential for physical transformation are "cookable." Accordingly the present invention relates to a method of processing cookable mixtures by means of energy injection by a vibrating surface.

Ultrasonic tools have been well described in texts and invention disclosures for the last 50 years. Basically, a resonant body is activated with a transducer of either the magnetostrictive type or piezoelectric type. The piezoelectric transducer can be a single crystal or, more commonly, a Langevin sandwich type where multiple crystals are held together between a front and rear mass with compression bolts. The tools of the prior art may be of a simple cylindrical rod type or a complex machining with shapes cut into the surface to accept workpieces of various configurations such as automotive tail lamp lenses. These tools have been used for ultrasonic cleaning, cell disruption and welding of thermoplastics or some metals.

In general, ultrasonic vibration can occur in four modes. One is longitudinally, where expansion and contraction takes place essentially along the major axis of the wave carrying body. In a second mode called "tansverse", a distal tip of the wave-carrying body whips from side to side. A third mode is radial vibration, where the part is expanding and contracting along a radial dimension. Torsional vibration is also possible, where the part is twisting. All of these modes are useful in creating a skinning effect pursuant to the present invention, although some modes are preferred over others.

One tool configuration pursuant to the present invention that has proven effective for generating a skin on an elongate flowable compositions is a radial ring resonator where multiple transducers are placed in vibration transmitting contact against the circumference of the tool. If the frequency of vibration of the transducers is the same as a radial resonant mode of the tool, then the tool be driven into sympathetic resonant vibration. The result will be that the inner diameter (ID) of the tool will expand and contract radially. By fashioning an inlet and outlet which are sealed against the sides of the tool, a flowable mixture may be pumped through the annulus of the tool, generating a skin along an outer surface of the mixture as the mixture passes the vibrating surface of the annulus. Simple cutters may be used to produce cylindrical shapes of any desired length. Additional tools may be used to provide a traditional sausage shape to the cylindrical extrudate. Although a circular cross sectional shape is standard in the hot dog industry, it is envisioned that any geometric cross section may be made available by configuring the annular space, so that it assumes for example a cross-section in the shape of a star, a hexagon, a triangle, etc.

A ring resonator as used in the present invention may be characterized by its geometry wherein a height or longitudinal dimension of the ring, as measured parallel to the axis thereof, is equal to or less than that of the outer diameter of the ring. If the longitudinal dimension is significantly greater than that of the diameter, a tubular resonator is formed. By mounting transducers on the outer circumferential surface of a tubular resonating body, a greater length of active surface and longer processing times at a constant throughput are achieved.

A second arrangement of apparatus for generating a skin on a mixture of particulate components employs, in accordance with the present invention, tools designed to operate in a longitudinal mode, that is with waves compressively transmitted along an axis of wave propagation. A cylindrical bore is provided in a tool so that the bore has an axis essentially perpendicular to the wave propagation or longitudinal axis of the tool. Once the working part or tool is connected to a single transducer and set to vibrate, the bore surface will deform at a frequency of vibration with a principal mode which alternately dilates and contracts the bore long two orthogonal axes, each orthogonal to the bore axis.

Experience has shown that in this second arrangement of apparatus, surfaces essentially parallel to the longitudinal axis of the tool do not stiffen the surface of a flowable edible mixture such as a meat emulsion as effectively as surfaces essentially perpendicular to that axis. Therefore, in the case of a bore as described, processing will not be symmetrical around the periphery of the product.

If we note that an angle of rotation about a the major axis of a cylindrical bore may be described as "azimuth," then we may compactly describe the non-uniformity of processing associated with the above described variation in amplitude of motion at the surface of the bore as showing unacceptable variation in azimuthal angle. However, by constructing another working part of the same dimensions as the first part and juxtaposing the two parts with a seal in between, with the second part is statically rotated through an angle of between approximately 10° and 170° around the common bore axis of the aligned parts, that is, in azimuth, more uniform processing may be obtained. Further multiple stages may be envisioned whereby several tools are placed in series to produce more uniform product or longer processing times. In this arrangement, the tools do not have to be driven synchronously, although this could be done on an optional basis if preferred.

In accordance with the present invention, a third arrangement of an apparatus for generating a skin on a flowable edible mixture is a modification of the second. A tool otherwise identical to one described in the preceding paragraph is truncated by a plane perpendicular to the longitudinal or wave propagation axis thereof and containing the major axis of the bore, thereby bisecting the bore. The truncated tool thereby includes a semi-cylindrical depression. It is found in this case that the tool may be designed so that the "wings" formed at the sides of the semi-cylindrical cut out, that is the edges or lips of the resulting depression, vibrate transversely. In other words the wings will move laterally in and out of the resulting semi-bore with a greater amplitude than that realized in the corresponding bore region of non-truncated part. By placing an opposing tool with a similar shape so that a new complete bore or cylindrical processing channel is formed and a composite assembly of two tools replaces a single monolithic tool, a increase in uniformity of processing in azimuth, or about the bore periphery, will result. As described above with respect to monolithic tools, multiple composite tool stations may be formed at staggered orientations or static rotations about the common bore axis to give different processing results, and in particular to further enhance processing uniformity about the periphery of the cylindrical extrudate.

The forgoing composite tool station may be described as a single annular or tubular resonator which has been bisected by a number of half-planes originating at the principal axis of the bore, the number of half planes in the first instance being two. Therefore we see a further modification of this adaptation is to multiply the number of segments of a single annular tool station beyond two, each segment being driven by a separate transducer. Each segment end or head must be sealed to adjacent ones so that mixture cannot leak out from the resulting bore. In this modification, multiple stages deployed along a common bore or extrusion axis are not generally needed, since each annular segment is designed and constructed to achieve equal vibratory output. A more uniform processing results.

It may been readily seen from the forgoing discussion that to improve uniformity of skin formation around the periphery of an essentially cylindrical extruded product, in accordance with the present invention, two strategies are contemplated. We may either employ a plurality of processing stations deployed along a common bore or processing axis, or, alternatively, we improve the uniformity of wall deflection in a single composite annular tool or processing station by segmenting the tool about the bore axis, thereby gaining greater detailed control of wall deflection amplitudes as a function of azimuth, or orientation angle about the bore axis, and facilitating more uniform processing in azimuth in a single stage or step. In the preceding, to avoid confusion, it should be noted that "annular" or "annulus" is taken both to refer to bodies with complete circular symmetry, similar to a "doughnut" or torus, and to bodies or composite bodies topologically similar to these solid shapes—in other words, to "things with a hole." The essential design question thereby becomes: Are satisfactory results achieved by utilizing the inherent vibrational modes of a single monolithic tool block with a bore or aperture, or shall we partition or segment this tool block, acoustically isolating the segments and driving them with separate transducers, thereby achieving more detailed control of the amplitude of deflection of the active tool surface. It is readily perceived that the above embodiments represent different answers to this design question, answers which may be multiplied and combined ad libitum without departing from the spirit of the invention, the reported embodiments representing best known reductions to practice.

In another embodiment of the present invention, we step back in the design decision tree from "things with a hole" to "things with a cavity." A mold may be constructed for batch or unit processing in distinction to the continuous processing contemplated in the previously described embodiments. In particular, a clam shell type mold is constructed in the same fashion as those found on injection mold machines. Both the top and bottom tools or mold halves are ultrasonically vibrated. By placing the tool halves together, injecting the mixture through a suitable port and activating the tools ultrasonically, a molded cylindrical shape may be formed. Then, by opening the mold and tipping the bottom mold, the formed product may be expelled from the device. Closing the mold and injecting mixture starts another cycle. Another embodiment places a ball of mixture in the cavity and close the mold around it, thereby pressing a desired shape. An advantage of both of these embodiments is that the ends of the molded products may be fully formed and fused without the need for peripheral equipment. It is readily perceived in light of the preceding discussion that the secondary design question, whether the tool shall be monolithic or segmented (which must at least be answered by provision of two segments in the case of a mold to allow ejection of the processed product), may also be answered in the case of a mold with multiplication of tool segments beyond two, thereby forming a mold cavity with a multiplicity of acoustically independently drivable surfaces, and allowing the tool designer more detailed control of surface deflection amplitudes.

Another method of achieving greater control of surface deformations of a single tool block, in lieu of segmenting that tool block or part and providing each segment with a separate transducer, is to multiply the transducers or points of excitation on a single tool part without segmentation. In this manner a ring resonator for generating a skin on an extruded mixture such as an edible composition may have provision, in accordance with the present invention, for mounting multiple transducers on the periphery of the element, as is discussed in greater detail below. In that case, the ring resonator is designed using techniques known to the art so that a radial resonance mode is at or very near the desired operating frequency.

Frequency of operation of resonators in accordance with the present invention has been varied from low ultrasonic frequencies ($\equiv$20,000 Hz) to very high frequencies ($\approx$60,000 Hz) with reasonable results. Generally, increasing the frequency of operation will entail a decrease in the outer diameter of the resonator ring elements, given a fixed inner diameter dictated by the desired size of the finished product. The ring dimension parallel to product movement, or thickness, is somewhat arbitrary but will have an affect on the resonant frequency of the ring. The transducer outputs must be synchronized by any one of many methods known to the art. Otherwise, one transducer may expand while another contracts, setting off vibrations of opposite sign which could lead to wave cancellation and a non vibrating device.

Of somewhat greater importance is the symmetry of oscillation at the ID of a ring resonator in accordance with the present invention. If the ring does not oscillate symmetrically or if only asymmetrical deformation is present, then the frankfurter or other product will not have a skin created evenly, if at all, around its periphery. The resulting cylindrical product will be unstable.

It has been found that, contrary common sense expectations, an odd number of transducers mounted around the circumference of a resonator ring produces a far more uniform deformation around the ID of the ring than an even number of transducers. For instance, two transducers mounted in opposition deform the ring on the top and bottom only, and placing four transducers at 90° separation surprisingly does not improve the deformation symmetry significantly. However, mounting three transducers with 120° separation affords a better symmetry of deformation around the ID of the ring. In fact, mounting five transducers at approximately 60° separation (thereby leaving a single blank arc of 120°) has been found to produce almost perfectly circularly symmetric deformation.

A typical mounting arrangement for a ring resonator assembly in accordance with the present invention places a sealing ring on each side of an annular aperture to prevent the extruded mixture of edible components such as meat particles from oozing out under pressure. Screw type pumps, pneumatic pumps or piston pumps well known to the art may be used to force the meat mixture through the annular aperture.

It is a characteristic of oscillating tools that the mixture or slurry in contact with an oscillating part will tend to move away from the vibrating surface thereof. It has been found that the meat slurry will be pushed away from the vibrating surface of a resonating ring and not processed properly. Thus, in accordance with another feature of the present invention, a transport system for moving the flowable particulate composition advantageously provides a certain amount of increased mixture static pressure to ensure that the skin to forms properly on the flowable particulate composition. By reducing the exit diameter of a resonating ring with an orifice plate or reducing section, advantageously made of polytetrafluoroethylene, a back pressure is set up in the system which serves to keep the slurry in contact with the ID of the ring so that proper skin formation takes place. Other means of inducing back pressure may be constructed by those schooled in the art within the contemplation of the present invention. Yet another embodiment of the present invention when using a ring, tubular, or longitudinal resonator with a through bore, is to taper the bore from proximal to distal end slightly. The converging section causes a back pressure to build during conveyance of a particulate meat mixture or slurry, thereby keeping the meat mixture in contact with the inner surfaces of the resonator.

Ring resonators allow only a small linear distance of surface contact between the ultrasonically vibrated ring and the extruded product. As the flow rate of the mixture increases, the contact time, which is the critical variable in some cases, decreases. To gain process time, additional rings may be stacked in series, as has been disclosed above. Another method of gaining process time with increasing flow rate is to fashion a tubular resonator. Although similar in concept, the tubular resonator is more difficult to analyze and may have nodes (points of no motion) and antinodes (points of maximum motion) at many points along the surface. Nonetheless, successful tubular resonators have been constructed and can be practical.

In accordance with another feature of the present invention, an alternate method of achieving a longer processing path relative to that of a ring or annular resonator is by drilling a bore through a single tool block designed to support standing ultrasonic compressional waves perpendicular to a wave transmission axis, that is, in a longitudinal mode. This tool block may have a rectangular, square or round cross section as known in the art. Before the device is tuned to the desired resonant frequency a cross bore is drilled in the tool in a direction essentially perpendicular to the longitudinal axis of the tool itself. The diameter of the bore should be approximately ½ that of the width of the tool at that point. Also, the bore should be located as close as practical to the vibrating end or antinode of the tool. This positioning of the bore will tend to maximize vibrations developed at the surfaces of the bore. The other end or input antinode of the tool is attached to a vibration generating transducer by means of a threaded stud or bore. The mating faces of the tool and the transducer are tightened together by means of a wrench. By mating the faces together, the transducer and tool become a single tuned member that has a common resonant frequency and can be driven by ultrasonic frequency generators known to the art.

It has been found that this type of tool used in a single stage does not allow the production of a symmetrical skin on an elongate meat product. The amplitude of deformation is not uniform around the bore ID. Therefore, in accordance with another feature of the present invention, in order to obtain a uniform skin thickness, a second identical tool/transducer arrangement may be positioned next to the first and aligned so that the bores communicate. A ring seal, advantageously polytetrafluoroethylene, may be fashioned so that the meat slurry does not leak from the interface and so that the vibrating metal parts do not touch. The second tool is advantageously statically rotated between 10° and 170° with respect to the first tool about a common bore axis.

A modification of the bored tool concept entails, in accordance with the present invention, truncating the tool in a plane perpendicular to the longitudinal axis thereof and bisecting the bore. This advantageously places the centerline of the bore at an antinode of the tool, where maximum displacement occurs, and further, the sides, or wings, of the truncated tool are found to deform inwards and outwards with greater amplitude than the corresponding region of the untruncated tool, giving a more even skinning effect. The resulting probe is easier to analyze by conventional techniques as well. Of course, a second tool must be mounted exactly opposed to the first so that the faces adjoin. A thin sealing pad is inserted between them to prevent leakage and prevent direct contact between tool bodies. Again, two or more sets of tools may be arranged in series to improve symmetry of skin formation.

As discussed above, molds may be employed to form skin-bearing product on a piecewise basis rather than extruding a continuous solid cylindrical product or sausage link train. In most of the embodiments discussed above, meat mixture is pumped through a tool or composite tool on a continuous basis. This allows maximum efficiency or throughput. However, only the outer circumferential surface of the cylindrical extrudate is sealed by the ultrasound. As the resulting product is cut to length, the shape of the ends tends to be flat or square cut, unless the processing line is provided with peripheral equipment to form the end shapes. Although fully functional, square cut sausage ends may not meet customer expectations of frankfurter appearance.

In order to provide a more classic hot dog shape, a mold may be formed from two ultrasonic tools. Both tools have a cavity which is a half section of the finished product shape, and are driven by separate transducers. Synchronization of the drives is not necessary. A clam shell type mold is constructed similarly to commercial injection mold machines.

A typical manufacturing process for a sealed molded frankfurter in accordance with the present invention comprises 1) spraying a food grade grease onto two mold halves, 2) bringing the two halves of the mold together by means of hydraulic, pneumatic or linear motors, 3) injecting a meat mixture into a cavity in the adjacent mold halves by means of ports in either or both mold halves, 4) ultrasonically vibrating the mold halves for a predetermined time period, after which the ultrasonic vibration is stopped, and 5) separating the mold halves and ejecting a formed frankfurter by a conventional piston or by tilting the bottom mold half. If the mold halves are oriented vertically instead of horizontally, the formed frankfurter could drop free from mold under gravity force alone. This process gives a shaped product which conforms to the conventional hot dog configuration. Note that a thin pad of polytetrafluoroethylene or other suitably inert material must be disposed between the mold halves for sealing and tool isolation. A sealing strip or O-Ring may be substituted.

In all embodiments, the construction material for the resonator element or elements is chosen to have good acoustic properties such as high Q and low internal loss. The material should be fairly resistant to erosion caused by cavitation or the sliding friction of viscous material flow. Since foodstuffs will come into direct contact with the resonator, that element must be approved for by the FDA for commercial use. Stainless steel is normally specified for food handling equipment since that material is sufficiently hard and non-reactive to resist corrosion and other erosive effects when the machinery is repeatedly sterilized by steam. However, the internal losses of stainless steel are fairly high when that material is used in an acoustic resonator. Titanium has been proven to be an acceptable material in all respects; however, in some cases stainless steel or even aircraft grade aluminum may be substituted. The novelty and utility of the present invention do not lie predominantly in the choice of materials, although some art has been developed in their optimum choice.

BRIEF DESCRIPTION OF THE DRAWINGS

FIG. 8A is a schematic perspective diagram of a processing train in accordance with the present invention.

FIG. 8B is a perspective view, on a larger scale, of an illustrative section of product shown in FIG. 8A.

DETAILED DESCRIPTION OF INVENTION

Figure 1B:
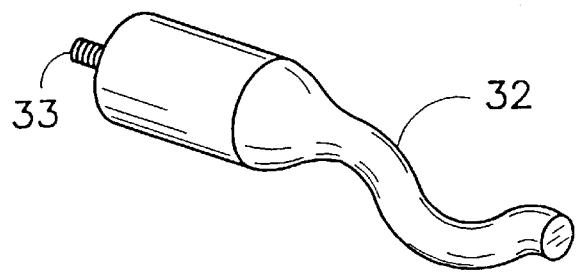
FIGS. 1A, 1B, 1C and 1D are perspective diagrams illustrating the various known modes of vibration of an ultrasonic tool.
Figure 1A:
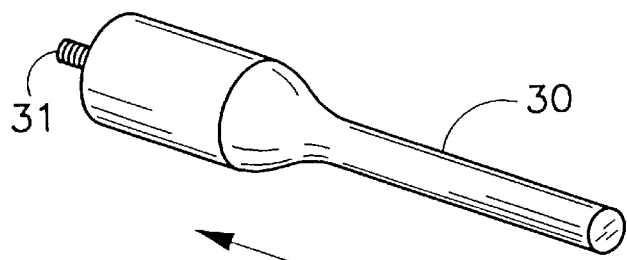
Figure 1D:
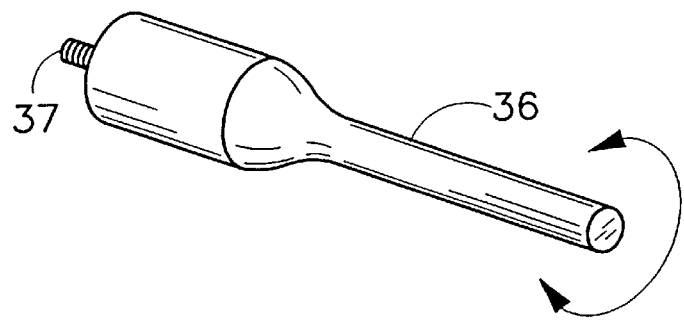
Figure 1C:
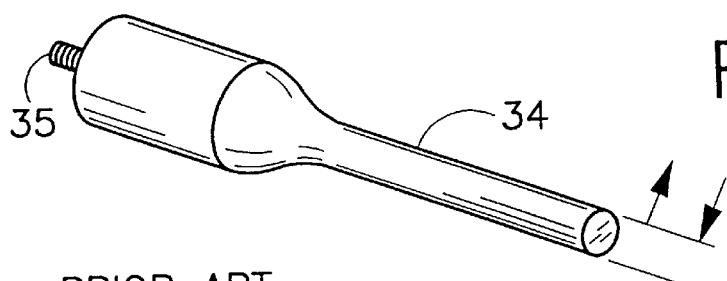

Acoustically activated, and in particular ultrasonic, tools may be designed to resonate (vibrate) in four modes, as shown in FIGS. 1A–D. In a first, longitudinal, mode of vibration, illustrated in FIG. 1A, an elongate tool 30 is energized to expand and contract essentially along its major axis. Tool 30 is provided with a threaded stud or post 31 for operatively connecting or coupling the tool to an electromechanical transducer assembly (not illustrated). A second type of mode (FIG. 1B) is called transverse, wherein a differently designed tool 32 whips from side to side at its free tip. In a third mode of vibration, namely, radial resonance, the diameter of a tool 34 expands and contracts, as illustrated in FIG. 1C. Torsional vibration, as shown in FIG. 1D, is also possible, where a tool 36 is constrained to twist. Tools 32, 34 and 36 are respectively provided with threaded studs 33, 35 and 37 for operative attachment to transducer assemblies, as before. Tools may alternatively be provided with a female threaded coupling, that is, a threaded bore, for mechanical coupling with a threaded stud on an electromechanical transducer assembly (not illustrated). All of these modes are useful in generating a skin on a flowable particulate mass such as a meat product emulsion, although some modes are preferred over others in this application.

Figure 2A:
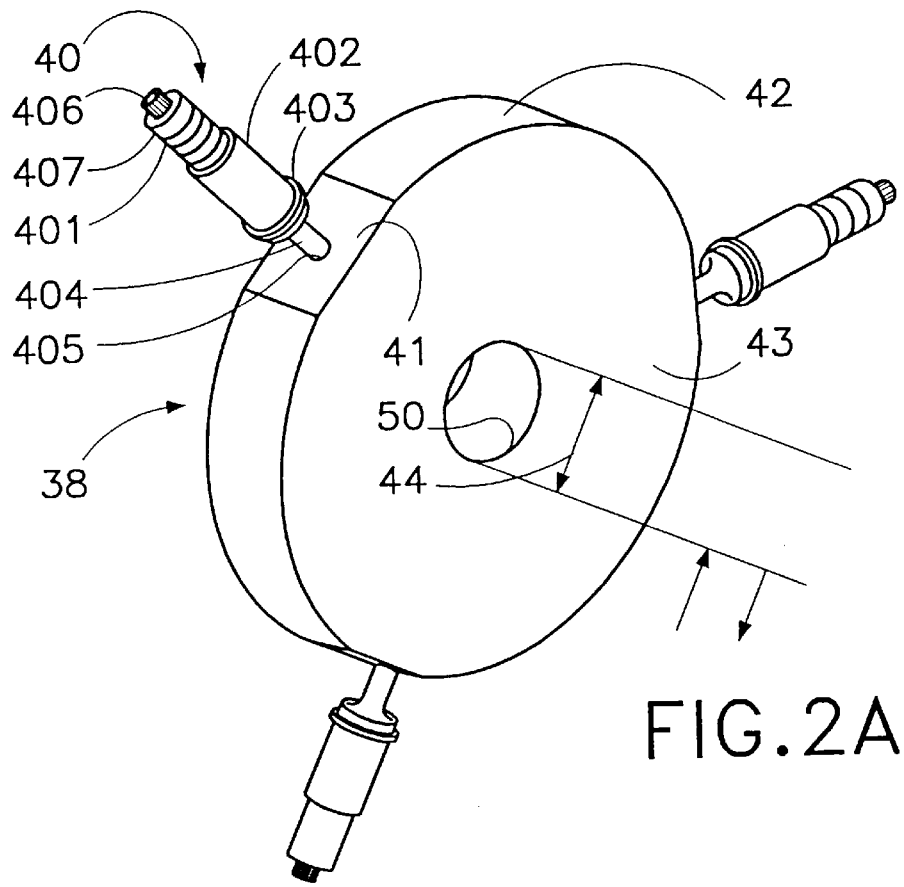
FIG. 2A is a perspective view of a ring resonator or annular ultrasonic tool, illustrating the placement of ultrasonic transducers, in accordance with the present invention.

One configuration that has proven effective for forming a skin on a cylindrical extrudate of particulate meat product is shown in FIG. 2A. Here, a radial ring resonator tool 38 has been constructed with multiple electromechanical transducer assemblies 40 mechanically coupled via a threaded post and bore arrangement (not visible) to machined land areas 41 of an outer circumferential surface 42 of a disk-shaped tool body 43. Electromechanical transducer assemblies 40 may comprise a stack of disk shaped electromechanical transducer elements 401 on a central post (not visible), partially contained by a sleeve 402 and resting at a lower or distal end on a flange 403. An extension 404 of the central post is provided with opposing lands 405 operatively engageable by a torquing tool or wrench for connecting assembly 40 to a tool part such as disk shaped body 43 via a threaded post and bore (not visible), with sufficient rigidity so that transducer assembly 40 and tool body 43 act as a single acoustically vibrating body, as is known in the art. Electromechanical transducer assemblies such as assembly 40 and the coupling of them to metal tool bodies being well known in the art and not an improvement of the present invention, electromechanical transducer assemblies will hereafter be referred to simply as "transducers", standard components as described above being understood.

Figure 2B:
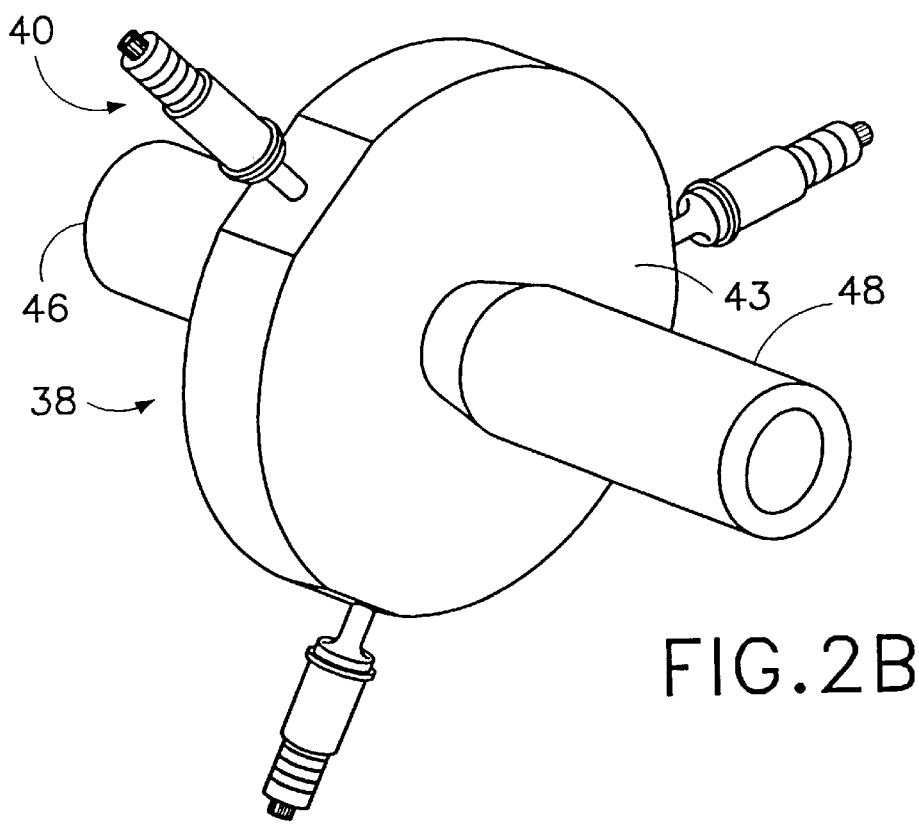
FIG. 2B is a perspective diagram depicting the ring resonator of FIG. 2A, with the addition of inlet and outlet tube for meat mixture flow.

If the frequency of vibration of transducers 40 is the same as a principal radial resonant mode frequency $f_0'$ of composite assembly or ring resonator tool 38, $f_0'$ being substantially identical to a principal radial resonant mode frequency $f_0$ of part 43, perturbed by the addition of transducers 40, then composite assembly 38 may be driven into sympathetic resonant vibration. The result will be that an inner diameter (ID) of tool part 43, indicated by a double head arrow 44, will expand and contract. By fashioning an inlet pipe 46 and outlet pipe 48 which are sealed against the sides of part 43 as shown in FIG. 2B, a semi-solid mixture or emulsion may be pumped through an aperture 50 (FIG. 2A) of part 43, being processed as it passes the radially vibrating surface of the aperture 50, so that a skin is formed on the mixture. Although a circular-cross section is standard in the hot dog industry, it is envisioned that the aperture 50 may be of any geometric cross-section, such as a star shape, hexagon, triangle, etc.

Figure 11A:
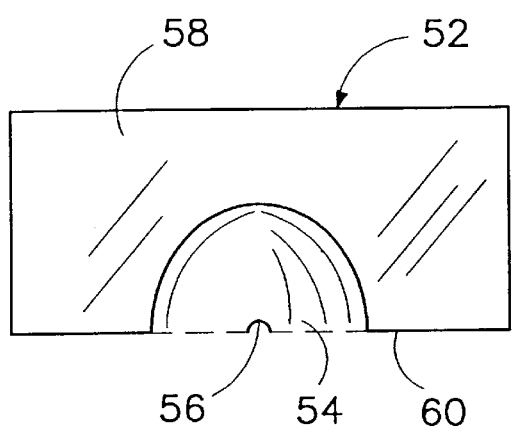
FIGS. 11A, 11B are a schematic front and a side elevation depicting a die block tool in accordance with the present invention, for the formation of sausage end segments.
Figure 12:
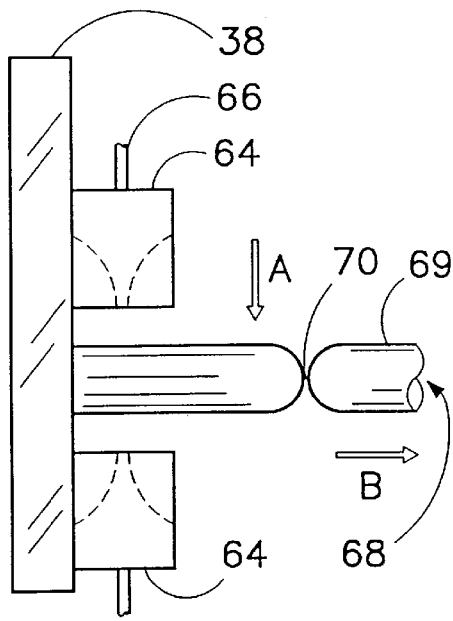
FIG. 12 is a schematic elevational view of a mechanism, in accordance with the present invention, incorporating a die block and a ring resonator tool for the formation of a complete traditional sausage shape.
Figure 11B:
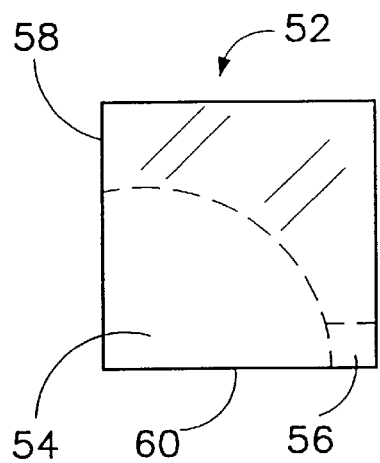

Simple cutting or termination devices may be used to produce axially symmetric or partially symmetric product shapes of any length (not shown). Alternately, the termination devices may be configured to provide traditional hot dog terminations, as illustrated in FIGS. 11A, 11B and 12. A die block section 52 illustrated in FIGS. 11A and 11B surrounds a substantially quarter-spherical cut-out defined by a recessed surface 54, adjoining a front face 58 and a bottom face 60. The quarter spherical cut-out communicates with a substantially semi-cylindrical section defined by a further recessed surface 56, which extends to a rear face 62 of die block 52. In practice, two die block sections 52 may be regarded as fused along rear face 62 to form a single die block 64, as illustrated in FIG. 12. Of course, composite die block 64 may be manufactured as a single piece. In order to produce a hot dog termination station, a pair of die blocks 64 are mounted adjacent to tool 38, as illustrated in FIG. 12, and operatively connected to rods or brackets 66, or other means for transmitting compressive forces. A cylindrical meat product extrudate 68 passes between opposing die blocks 64, which are periodically pressed together by rods or brackets 66 in a motion parallel to arrow A to form constricted sausage sections or linkages 70 between adjacent sausage links 69. Semi-cylindrical recessed surface 56 may also be made flush with surface 60 to eliminate material at sections 70, and allow severed links to fall free. Transducers 40 (FIGS. 2A and 2B) may be periodically cycled on and off in coordination with the reciprocation of die blocks 64 in order to permit the formation of linkages 70 in previously unprocessed sections of extrudate or sausage link train 68. Alternatively, a continuous skin formed by tool 38 on extrudate 68 may be simply broken and reformed by action of die blocks 64 if a less fine surface texture at sausage linkages 70 is acceptable. Die blocks 64 are, of course, operatively connected to electroacoustic transducers (not illustrated) to enable a skin forming operation, and provided with a low-friction sealing layer at face 60 to prevent direct contact of opposing tools and possible product leakage. Although the extrudate is illustrated here as a continuous sausage link train, semi-cylindrical recessed surface 56 may be reduced or eliminated to form unconnected sausages which fall free after the end forming operation; in this case the processing station may be advantageously oriented so that arrow B points in a vertically downward direction, so that completed links 69 fall free under gravity.

Figure 13:
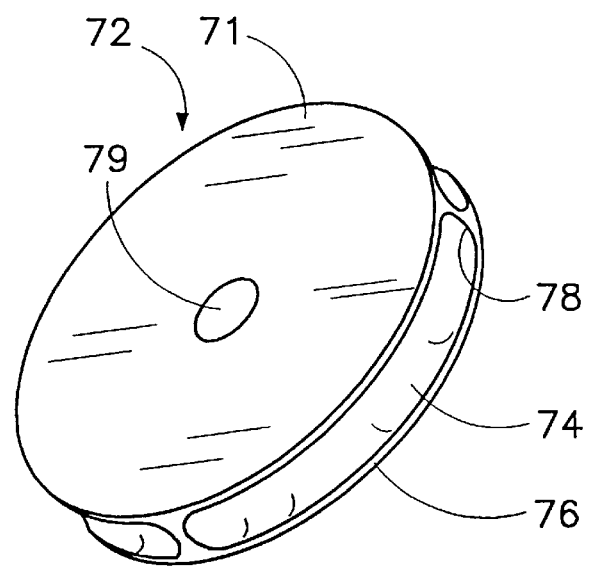
FIG. 13 is a perspective diagram of a further specialized tool shape in accordance with the present invention, for forming sausage ends.

In an alternate embodiment of an end-forming apparatus, a spool-shaped tool 72 (FIG. 13) is provided with a groove or circumferential recess defined by a curved semi-cylindrical surface 74, and circumferential lands 76. The recess defined by surface 74 is periodically interrupted by end surfaces 78 contiguous with surface 74. End surfaces 78 are essentially identical to the quarter-spherical working surfaces 54 and 56 of die block sections 52, modified along with contiguous surfaces 74 to conform to a circumference of spool 72. A threaded central bore 79 is provided at a principal axis of spool 72, centered on lateral face 71, as an attachment point for an ultrasonic transducer.

Figure 14:
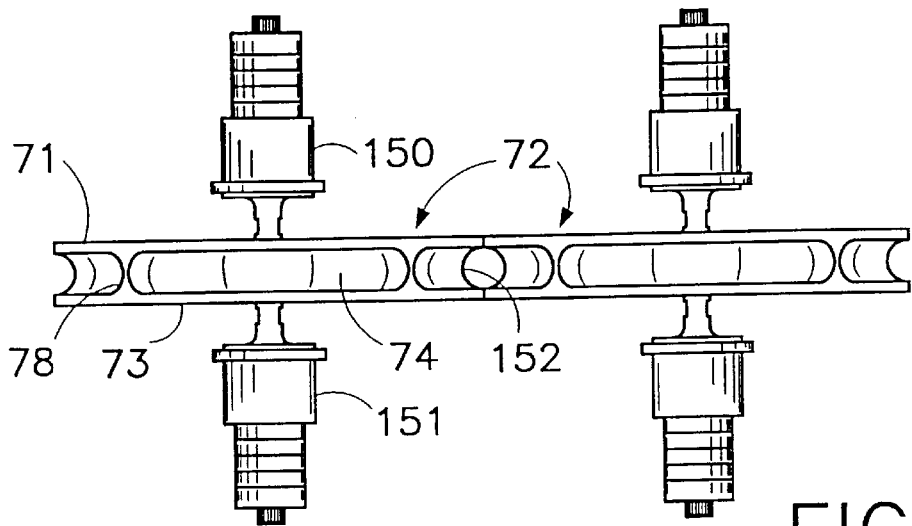
FIG. 14 is an elevational view illustrating the mode of employment of a pair of tools as disclosed in FIG. 13.

As illustrated in FIG. 14, a pair of synchronously excitable transducers 150 and 151 are mounted at threaded bore 79 to opposite lateral faces 71 and 73 of spool 72, thereby simultaneously serving as axles or spindles for rotation (FIG. 14). A pair of spools 72 are mounted adjacently and configured to synchronously counter-rotate, producing a bore 154 defined by moving semi-cylindrical surfaces 74. Electrical operation of ultrasonic transducers 150, 151 attached to a rotating tool may be accomplished by provision of a co-rotating ultrasonic power supply powered by brush contacts (not separately illustrated).

Figure 15:
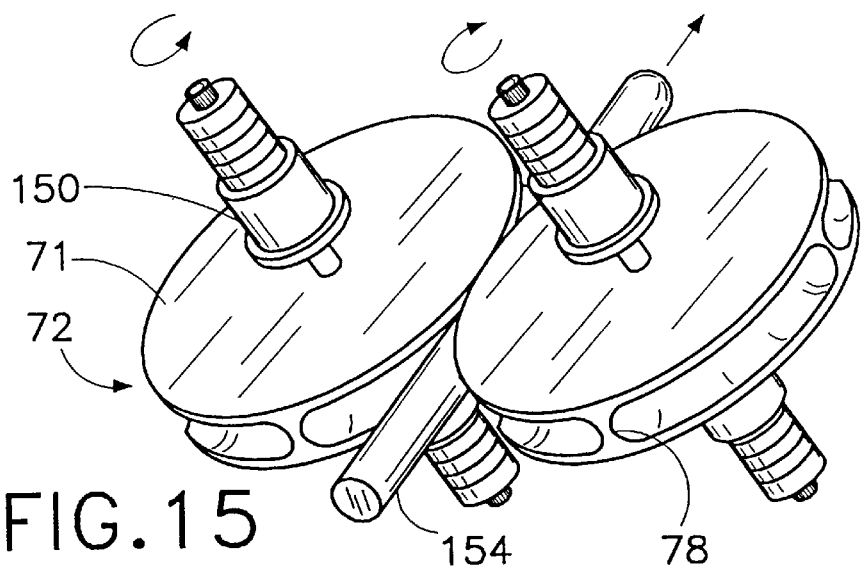
FIG. 15 is a perspective view of the tools shown in FIG. 14.

The above described mode of operation of end-formers 72 is further illustrated in FIG. 15, where extrudate 154, output from an operation creating a cylindrical skin (not separately illustrated), passes between rotating and ultrasonically active spools 72, whereby a periodic juxtaposition of opposing end forming surfaces 78 shapes the ends of, creates new skin surface on, and severs individual hot dogs or sausage links. The links then fall free and may be handled in subsequent processing operations by standard methods known in the art.

Figure 16:
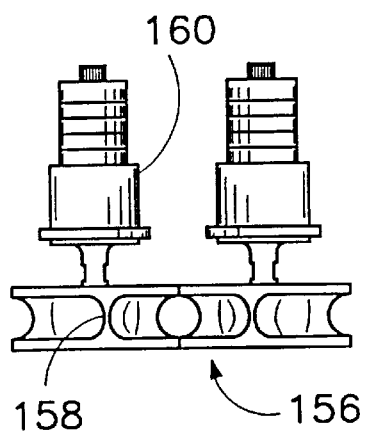
FIG. 16 is an elevational view of a modification of a plurality of modified tools, further showing a mode of employment of those tools.
Figure 17:
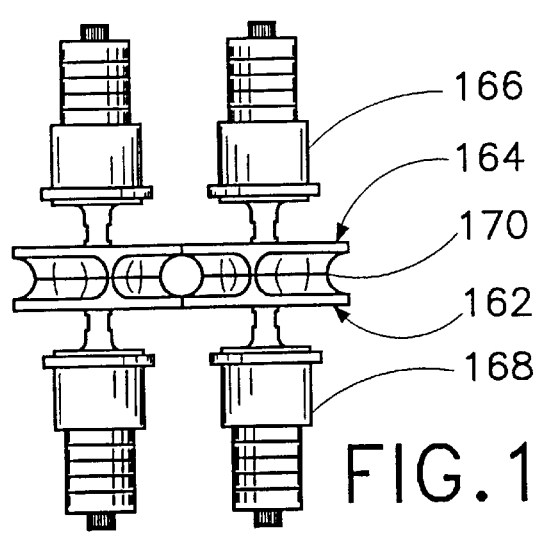
FIG. 17 is an elevational view of a modification the tools of FIG. 16.

Spools 72 are illustrated as producing approximately three sausage links per rotation. An alternative embodiment shown in FIG. 16 utilizes smaller diameter spools 156 with end-forming surfaces 158 to produce one link per rotation. The smaller size of tools or spool shapes 156 may permit use of a single transducer 160 mounted to each tool. To improve uniformity of processing, spool 156 may be replaced by two half-spools 162 and 164 formed by symmetrical bisection of spool 156 along a plane interface parallel to the lateral faces thereof, in analogy to the bisection of a tool illustrated in FIGS. 4A and 4B, as shown in FIG. 17. In this arrangement transducers 166 and 168 need not be operated synchronously, insofar as a layer of insulating material (not separately designated) is inserted at interface 170.

In an alternative use of spool shapes as ultrasonic tools for forming elongate forms with skins, a pair of vertically mounted spools rotating about horizontal axes may be provided with vertical baffle plates co-planar with faces 71 and 73 (FIGS. 13–15), thereby forming a hopper above a nip between the spools, the spools being configured to move surfaces 74 downward through the bore or processing region 152. A food mixture filling the hopper is partially gravity fed and partially drawn between the rotating spools, to form completed sausage shapes in one operation.

Figure 3A:
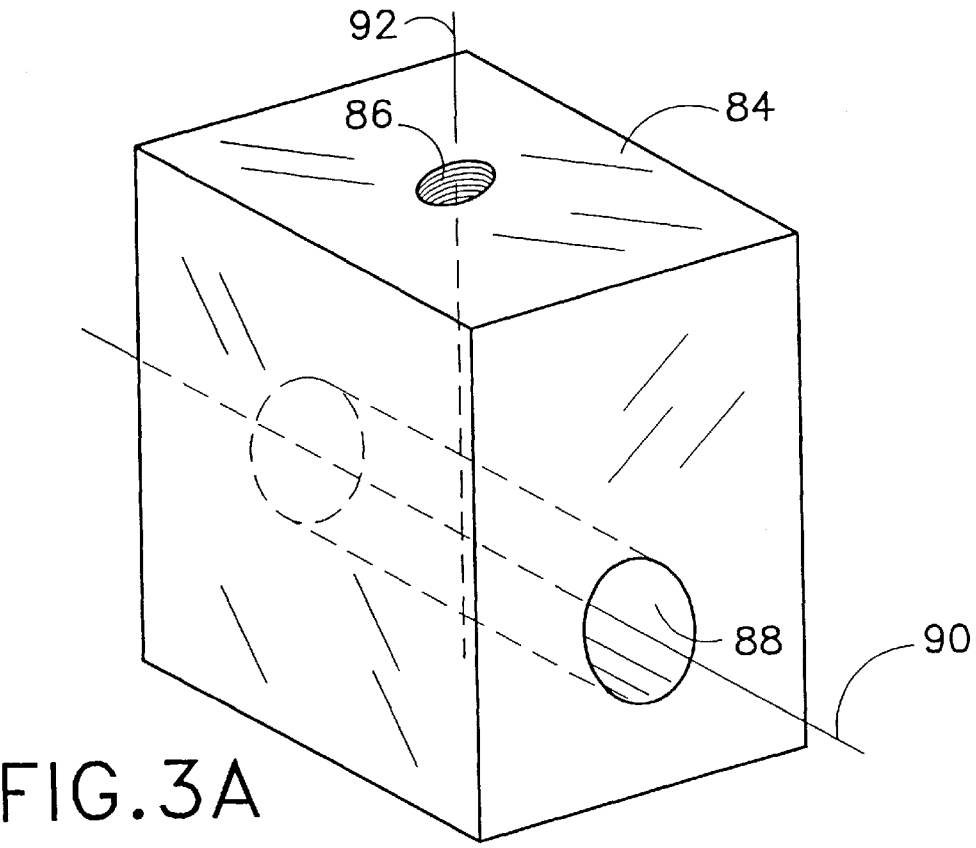
FIG. 3A is a perspective view of a block ultrasonic tool with a bore drilled perpendicular to a longitudinal axis of vibration.
Figure 3B:
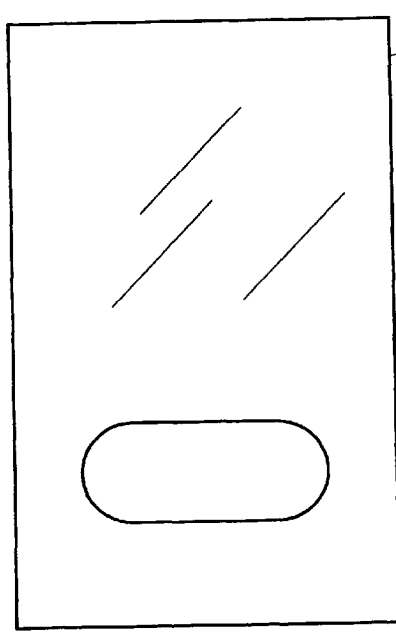
FIGS. 3B and 3C are schematic elevational views each schematically depicting a major mode of vibration of the tool illustrated in FIG. 3A.
Figure 3C:
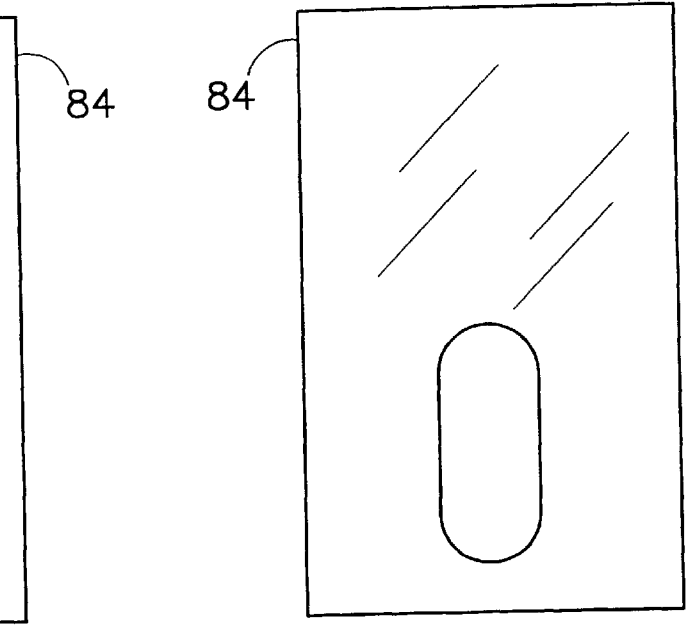

An alternative embodiment of the present invention is illustrated in FIG. 3A. A tool 84 is designed to operate in a longitudinal mode, with waves compressively transmitted along an axis of wave propagation 92 coincident with an axis of bore 86, which is adapted to receive an ultrasonic transducer assembly. A cylindrical bore 88 with an axis 90 essentially perpendicular to the wave propagation or longitudinal axis 92 of tool 84 is provided. Once the working part or tool is connected to a transducer and set to vibrate, the bore surface will deform in a principal vibratory mode alternately dilating and contracting the bore along two mutually perpendicular axes (not separately designated), each orthogonal to bore axis 90, as shown in FIGS. 3B and 3C.

It has been found empirically that tool 84 does not by itself form a symmetrical skin on a cylindrical meat product. Those portions of surfaces 88 which are essentially parallel to longitudinal axis 92 do not stiffen the surface of a meat product as those effectively as surface portions which lie essentially perpendicular to the axis, a situation which may be by comparison of FIG. 3A to a representation in FIG. 1A of an exemplary longitudinal tool: Excluding the effect of the bore itself, surfaces perpendicular to the axis of wave propagation tend to oscillate in step with planar pressure waves, whilst surfaces perpendicular to these planes tend to remain stationary. This leads to non-uniform processing around the periphery of a cylindrical extruded product. However, where another tool of the same dimensions is placed next to the first tool 84 with a seal in between, so that the bores communicate, a more uniform processing may be obtained.

Figure 10:
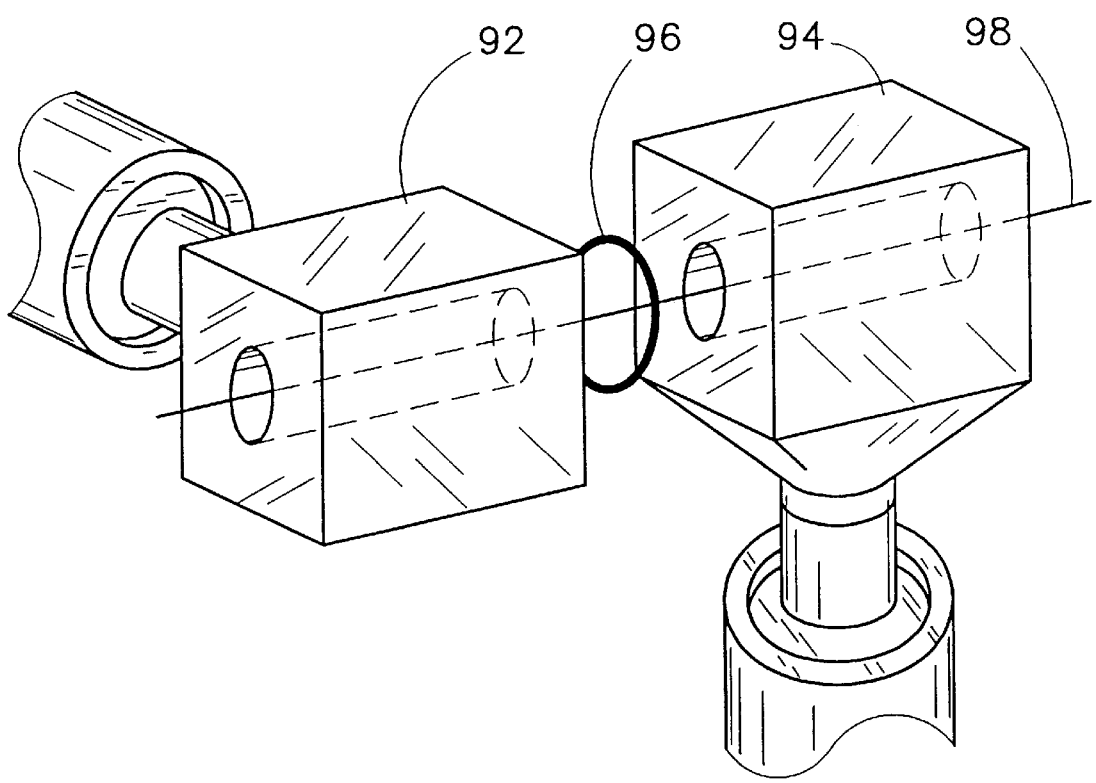
FIG. 10 is an exploded schematic perspective view of a further embodiment of the present invention, illustrating a pair of block resonators in accordance with FIG. 3, disposed at spaced angular positions about a bore axis.

In the apparatus depicted in FIG. 10, tool blocks 92 and 94 are separated by a seal ring 96, which may be manufactured of a chemically and physically stable deformable seal material, for example, polytetrafluoroethylene. Ring 96 is fashioned so that the meat slurry does not leak from the interface between blocks 92 and 94 and so that vibrating metal parts do not touch. Tool 94 is advantageously disposed at an angle of between 10° and 170° about a common bore axis 98 with respect to tool 92. This angular staggering of tools 92 and 94 will allow even skin formation. Multiple stages may be envisioned whereby more than two tools are placed in series to produce more uniform product and/or longer processing times (not illustrated). In these arrangements, the tools do not have to be driven synchronously, although this could be done on an optional basis if preferred.

Figures 4A, 4B:
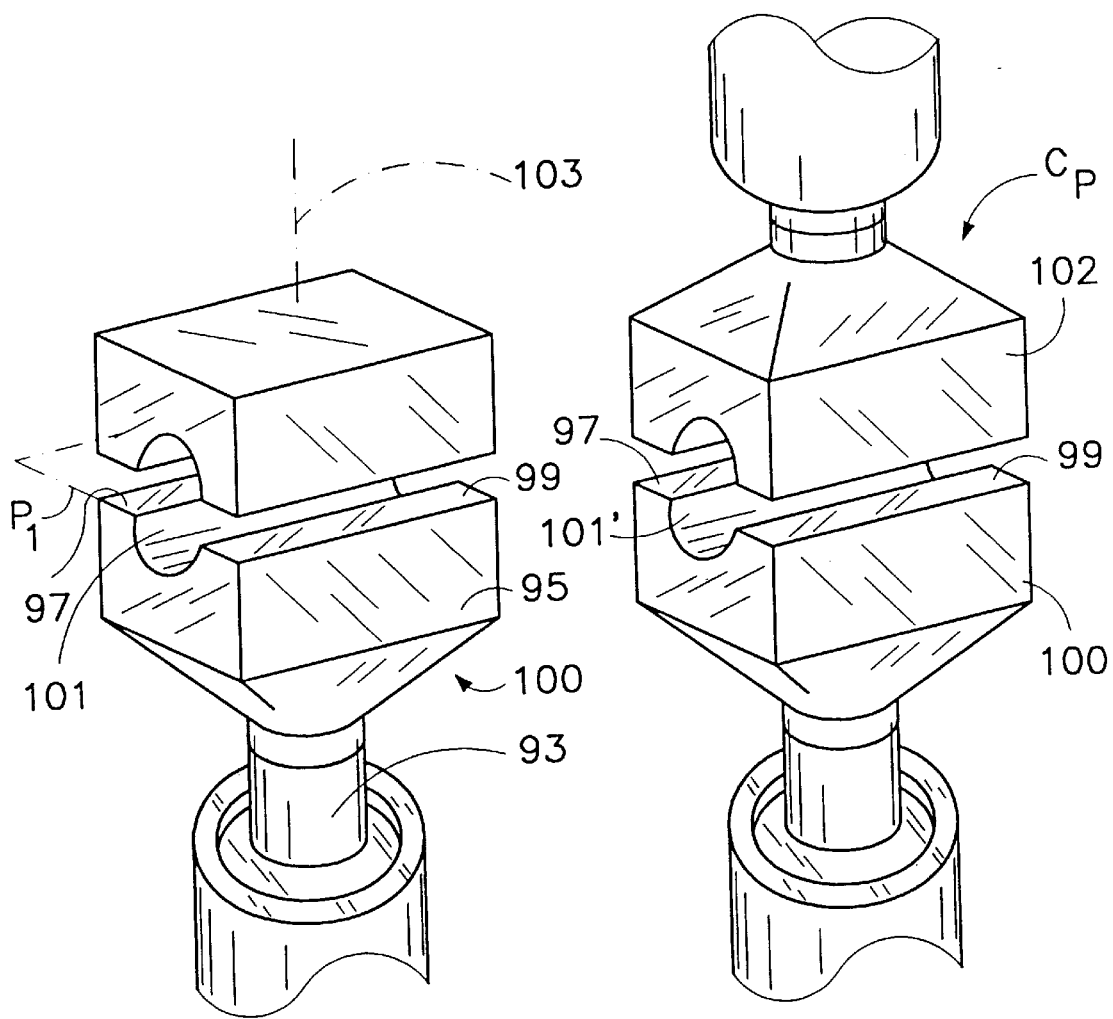
FIG. 4A is a schematic perspective view of an ultrasonic tool with a bore, sectioned perpendiculary to a longitudinal vibration axis of the tool, in accordance with the present invention.
FIG. 4B is a perspective of a pair of ultrasonic tools sectioned as shown in FIG. 4A, placed adjacently so as to form a new bore, in accordance with the present invention.

Yet another embodiment of an apparatus using mechanical vibration energy to form a skin on a particulate meat mixture modifies a tool block of the type provided with a bore 88 perpendicular to a longitudinal axis 92 discussed above with reference to FIGS. 3A–3C. In this modified arrangement, as shown in FIG. 4A, a tool 100 is truncated along a plane P1 extending axially through a bore 101 and perpendicular to a longitudinal axis 103 of wave transmission. Tool 100 is thus formed to have a shaft 93 and a head 95 provided with a semi-cylindrical recess (not separately designated) representing half of bore 101, and further provided with a pair of elongate land surfaces 97 and 99 flanking the semi-cylindrical recess and extending in plane P1. By placing an opposing tool 102 with a similar shape adjacent to tool 100 so that the semi-cylindrical recesses are parallel to and face one another, a new bore 101' is formed, as shown in FIG. 4B, so that two tools form a composite tool assembly Cp, replacing a single tool. Of course, low-friction sealing gaskets (not shown) are placed between the opposing land surfaces 97 and 99 of tools 100 and 102. Azimuthal uniformity of processing may be still further improved, as discussed in the preceding paragraph with reference to monolithic tools 92 and 94, by disposing multiple composite tool stations Cp at different orientations around a common bore axis (not separately illustrated).

Figure 5:
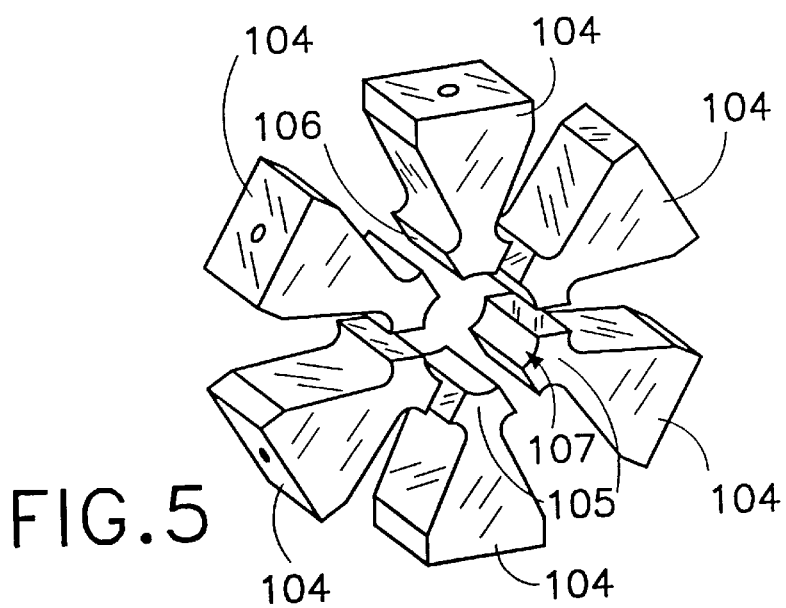
FIG. 5 is a perspective diagram of a further variation of the embodiment of FIG. 4B, showing multiple tool segments placed circumferentially adjacent to each other to form a single bore, in accordance with the present invention.

As an alternative to multiplication of either monolithic or composite tool block stages, azimuthal uniformity of processing may be improved in accordance with the present invention by increasing tool block segmentation about a principal bore axis in a single stage, as illustrated in FIG. 5. A multiplicity of tool segments 104 each is driven by a separate transducer (not shown). In particular, tool segments 104 are longitudinal resonators with end shapes or heads 105 which are essentially respective sectors of an annulus. Tool segments 104 and heads 105 are designed to allow three or more resonators to form a circular bore 107. An elastomeric or fluorocarbon type sealing material (not separately shown) is bonded to heads at lateral faces 106 thereof to prevent product leakage and prevent tools 104 from touching.

Advantages of the arrangement of FIG. 5 include simplicity of design and elimination of the need for synchronous driving electronics. Each vibrating tool 104 is independent of the other resonators, so each resonator 104 may be driven to a different amplitude to achieve a perfect symmetrical skin. Multiple stages are not contemplated as necessary, since each tool or resonator 104 may be designed and constructed to achieve vibratory output equal to the other tools or resonators. A more uniform processing of an outside surface of an extruded product will result.

In the embodiments discussed above, a flowable particulate mixture is pumped through a tool or composite tool on a continuous basis. This process tends to maximize throughput. However, only the cylindrically circumferential surface of the extrudate is sealed by the ultrasonic wave energy. As the resulting cylinder is simply cut to length, the shape of the ends would tend to be flat or square cut, unless the processing line is provided with peripheral equipment, e.g. FIG. 12, to form rounded end shapes. Although fully functional, flat ends may not meet customer expectations of what a frankfurter should look like.

Figure 6:
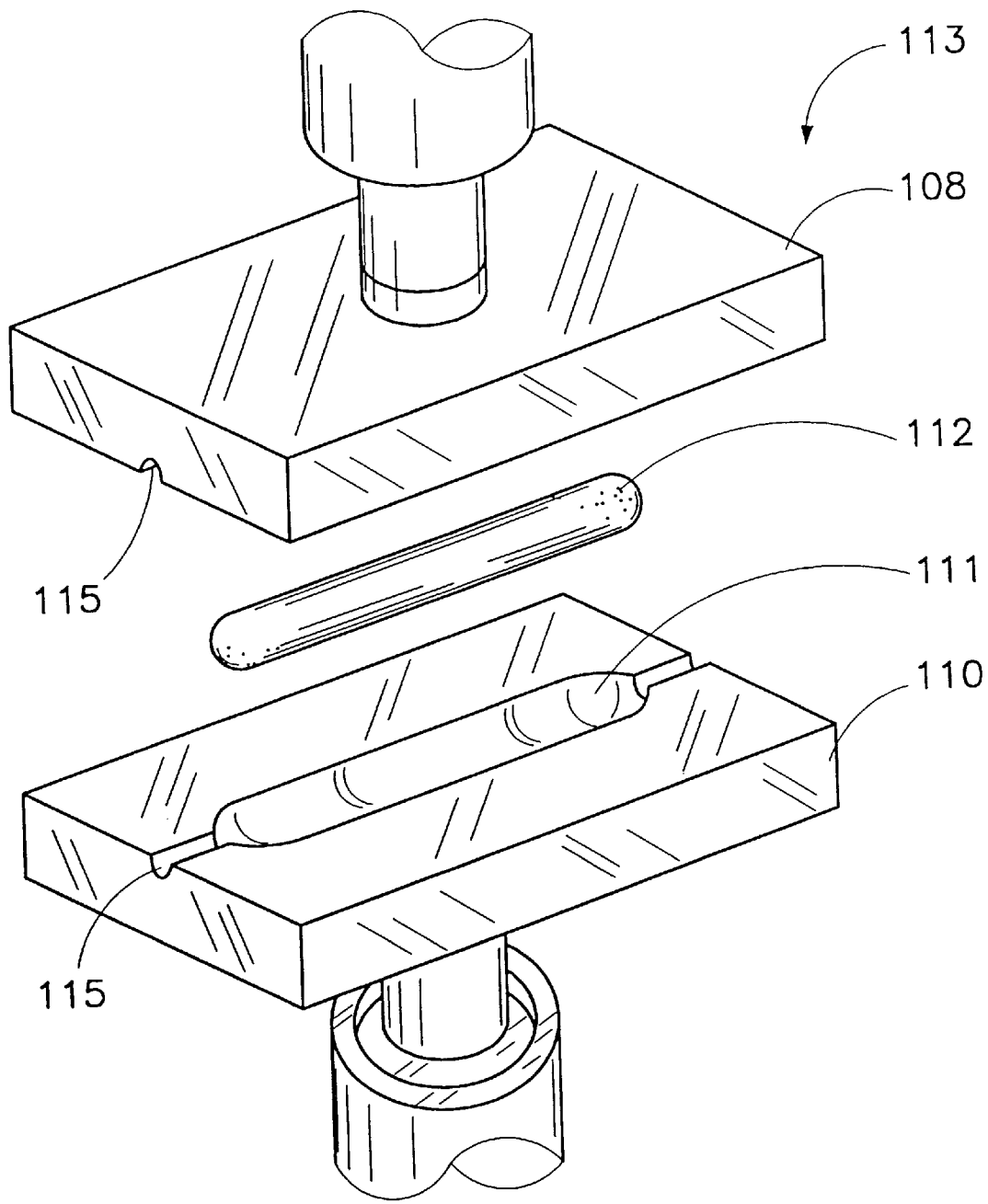
FIG. 6 is an exploded perspective diagram of a pair of clam shell style mold halves in accordance with the present invention, each mold half constituting an ultrasonic tool.

In order to provide a more classic hot dog shape, a mold may be formed from two ultrasonic tools 108 and 110, as illustrated in FIG. 6. Both tools 108 and 110 have a cavity 111 which is a half section of the finished product shape and are driven by separate electromechanical, e.g. piezoelectric, transducers (not illustrated). Synchronization of the drives is not necessary. Here, a clam-shell type mold 113 comprising mold-half tools 108 and 110 is similar in construction to molds used in injection mold machines. Both the top tool 108 and bottom tool 110 are ultrasonically vibrated. By placing the tools together, injecting the flowable particulate meat mixture from the side through a port defined by semi-cylindrical surfaces 115, and activating the tools ultrasonically, a molded cylindrical shape or hot dog 112 may be formed. Then, by opening mold 113 and tipping the bottom mold 110, hot dog 112 may be expelled from the device. Closing the mold and injecting another aliquot of particulate meat mixture starts another cycle. In a modified procedure, a ball of mixture is pre-positioned in the half cavity (not illustrated) to be formed by juxtaposed cavity halves 111, and the mold is closed around the ball, thereby pressing the ball into a desired shape. An advantage of these two embodiments, which form individual units of product rather than continuously extruding a sausage link train, is that the ends may be fully formed and fused without the need for peripheral equipment.

Figure 7A:
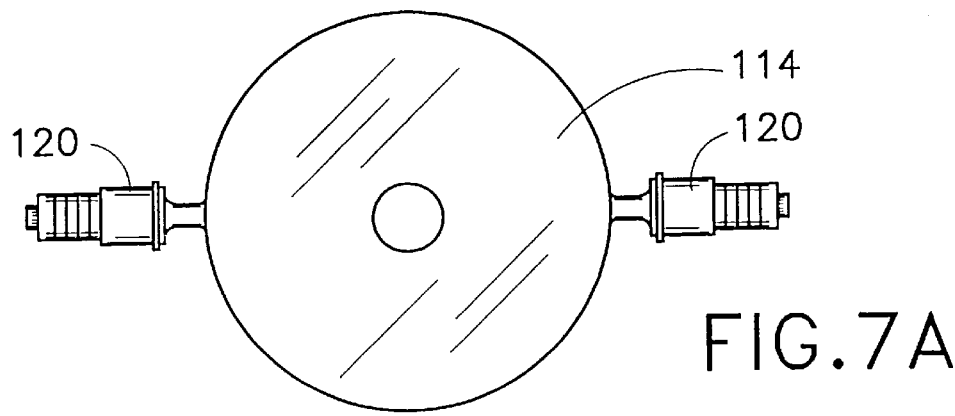
FIGS. 7A, 7B, 7C are schematic elevational views of ring resonators or annular tools, illustrating the placement of ultrasonic transducers thereon, in accordance with the present invention.
Figure 7B:
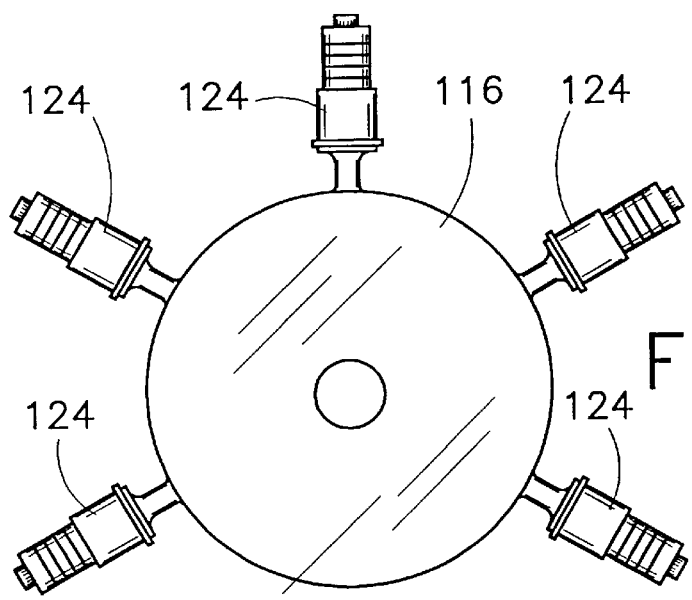
Figure 7C:
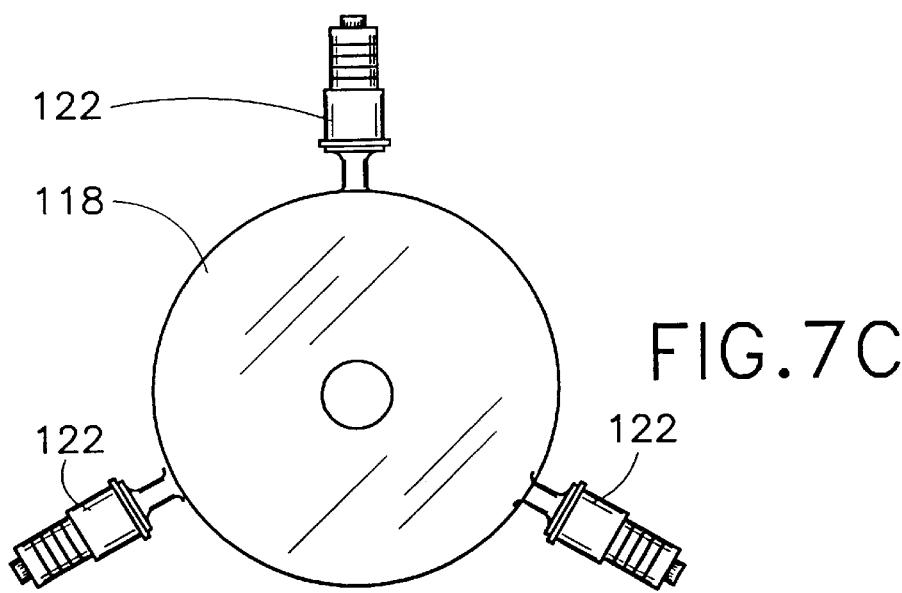
Figure 9:
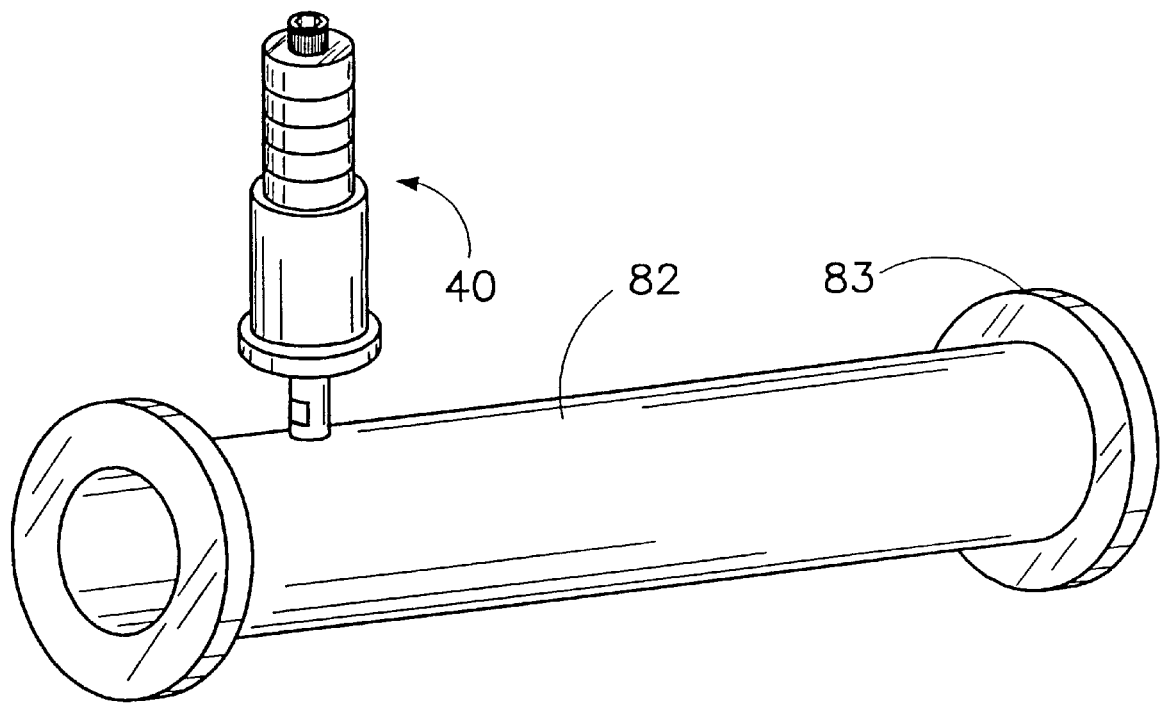
FIG. 9 is a schematic perspective view of a further embodiment in accordance with the present invention, illustrating a tubular resonator for forming a skin on an extruded meat product.

With regard to the angular or azimuthal uniformity of skin formation which may be obtained on product extruded through a ring or annular resonator configuration, FIGS. 7A–C depict ring resonators 114, 116 and 118 with transducers 120, 122 and 124 in wave-transmitting engagement with lands on outer circumferential surfaces of the resonators. These ring resonators 114, 116 and 118 are dimensioned so that the frequency of a radial resonance mode is at or very near the desired operating frequency. Of subordinate but still considerable importance is the symmetry of oscillation at the ID of the ring. If the ring does not oscillate symmetrically or if only asymmetrical deformation is present, then the frankfurter or other product will not have a skin created evenly around a periphery, and may fall apart during subsequent processing.

It has been found that an uneven number of transducers mounted around the circumference of the ring produces a more even deformation around the ID of the tool than an even number of transducers. For example, two opposing transducers 120 mounted in opposing fashion, as illustrated in FIG. 7A, will primarily deform ring 114 on the top and bottom only. Placing four transducers at 90° separation (not illustrated) does not improve circular deformation symmetry significantly.

Mounting three transducers 122 with 120° separation affords a better symmetry of deformation around the ID of the ring, as illustrated in FIG. 7C. In fact, mounting five transducers 124 in the fashion illustrated by FIG. 7B, with substantially 60° angular spacing and a single 120° gap, produces essentially circularly uniform skin formation on a product.

A typical mounting or process train arrangement for this type of system is shown in FIG. 8A. Meat mixture is made and held in a whipper chiller 132 and passes therefrom to a pump 130, which feeds the meat mixture under an effective overpressure through an inlet tube 134 to a processing region or aperture defined by an internal surface 136 in a ring resonator tool 138. Screw-type pumps, pneumatic pumps or piston pumps well known to the art and generically illustrated by pump 130 may be used to force the meat mixture through the ring resonator tool 138 equipped with standard transducer assemblies 40. Processed mixture or extrudate leaves the ring resonator tool 138 and particularly the aperture thereof through an exit tube 140. Sealing rings 128 on each side of tool 138 at the interface thereof with inlet and exit tubes 134 and 140 respectively prevent the meat mixture from oozing out under pressure, and prevent the direct contact of metal parts at least one of which is ultrasonically vibratable, which may otherwise become welded together during operation. A length of finished product 142 is illustrated in FIG. 8B, with a more detailed cross section thereof illustrated by magnified inserted view 144. Skin 146 is formed to a depth of deposition of sufficient energy by ultrasonic penetration, while interior region 148 remains unaltered, and ready for further cooking steps.

One of ordinary skill in the art will appreciate that the various tools, composite tools and processing trains may be modified to form further, equivalent tools, combinations of tools and processing trains. For instance, a composite annular tool with three resonator segments may be operatively combined and sealed to the end of, for example, a monolithic longitudinal resonator tool.

The present invention can find applications in other fields of industry, for example, in the processing of organic waste materials into fertilizers logs which may be planted along with seeds. Foodstuffs made in accordance with the present invention need not be intended for direct human consumption, but may be intended for the feed of domestic animals, e.g., cattle.

Other applications of ultrasonic cookery may also be envisaged: An electric skillet or griddle may be equipped with ultrasonic transducers in lieu of heating elements to transmit energy to foodstuffs placed upon its cooking surface, which may have certain utility over conventional heating; for example, an ultrasonic cooking surface may be able to sear or lock in the juices of a meat product without preheating, analogous to the disclosed application to hot dog manufacture, and accruing similar advantages.

Accordingly, it is to be understood that the drawings and descriptions herein are proffered by way of example to facilitate comprehension of the invention and should not be construed to limit the scope thereof.

What is claimed is:

1. A method for processing a comestible product, comprising:
    providing a cookable foodstuff;
    placing said foodstuff in contact with a surface; and
    after placing of said foodstuff in contact with said surface, ultrasonically vibrating said surface, to transfer sufficient energy to said foodstuff to form a skin on said foodstuff.

2. The method defined in claim 1 wherein said vibrating includes ultrasonically vibrating said surface in a frequency range of 20,000 Hz to 60,000 Hz.

3. The method defined in claim 1 wherein said foodstuff comprises a mixture of animal products and additives suitable for forming an edible sausage.

4. The method defined in claim 3 wherein said surface at least partially defines an aperture through which said mixture is extruded.

5. The method defined in claim 4 wherein said aperture is formed by at least two substantially acoustically uncoupled bodies vibratable in essentially acoustically independent modes, said bodies being separated along surfaces oriented substantially perpendicular to a direction of extrusion.

6. The method defined in claim 4 wherein said aperture is formed by at least two substantially acoustically uncoupled bodies vibratable in essentially acoustically independent modes, said bodies being separated along surfaces substantially parallel to a direction of extrusion.

7. The method defined in claim 1 wherein said surface comprises an interior surface of a plurality of mold portions which may be placed adjacent to one another to form a mold cavity.

8. The method defined in claim 7 wherein said foodstuff is a flowable mixture, and the placing of said mixture in contact with said surfaces includes injecting said mixture into said cavity.

9. The method defined in claim 7 wherein the placing of said mixture in contact with said surfaces includes placing a portion of the mixture on at least one of said mold portions prior to formation of said cavity.

10. An apparatus for altering the physical properties of comestible materials, comprising:
    a body member having a surface;
    means operatively connected to said body member for bringing a foodstuff in contact with said surface; and
    means operatively connected to said body member for ultrasonically vibrating said surface with an energy sufficient to form a skin on said foodstuff.

11. The apparatus defined in claim 10 wherein said means for vibrating comprises at least one electroacoustic transducer.

12. The apparatus defined in claim 11 further comprising means operatively connected with said transducer for operating said transducer in an ultrasonic frequency range of 20,000 Hz to 60,000 Hz.

13. The apparatus defined in claim 10 wherein said surface at least partially defines an aperture and said means for bringing comprises means for extruding said foodstuff through said aperture.

14. The apparatus defined in claim 13 wherein said aperture is tapered down from an inlet end to an outlet end for increasing back pressure during said extruding.

15. The apparatus defined in claim 13 wherein said means for extruding defines a principal extrusion axis, said surface having a first dimension parallel to said axis and a second dimension perpendicular to said axis, said first dimension being substantially greater than said second dimension, the surface thereby forming the interior of a tube.

16. The apparatus defined in claim 13 wherein said means for vibrating comprises a plurality of electro-acoustic transducers disposed around a perimeter of an annular block defining said aperture.

17. The apparatus defined in claim 16 wherein said plurality of electro-acoustic transducers consists of an odd number of said transducers.

18. The apparatus defined in claim 16 wherein said block includes a plurality of segments separated by sheets of insulating material disposed substantially in planes parallel to a direction of extrusion, said electro-acoustic transducers being connected to respective ones of said segments.

19. The apparatus defined in claim 13 wherein said aperture is defined by a series of bodies having opposing surfaces oriented substantially perpendicular to a direction of extrusion by said means for extruding, said bodies being separated by insulating layers interposed between said opposing surfaces for substantially acoustically uncoupling said bodies.

20. The apparatus defined in claim 19 wherein said layers are made of a polymeric flourocarbon.

21. The apparatus defined in claim 19 wherein said means for vibrating comprises a plurality of electro-acoustic transducers each operatively connected to a respective one of said bodies.

22. The apparatus defined in claim 19 wherein said electro-acoustic transducers are disposed at positions which are angularly staggered by an angle of between 10° and 170° on adjacent ones of said bodies.

23. The apparatus defined in claim 10 wherein said surface is an interior surface of one of at least two mold segments juxtaposable to form a cavity.

24. The apparatus defined in claim 23 wherein an insulating layer is interposed between said segments to render said segments substantially acoustically uncoupled.

25. The apparatus defined in claim 24 wherein said layer is made of a polymeric flourocarbon.

26. The apparatus defined in claim 23 wherein said means for vibrating comprises a plurality of electro-acoustic transducers, at least one of which is operatively coupled to each of said segments.

27. The apparatus defined in claim 10 wherein said surface is an interior surface of one of at least two mold segments juxtaposable to form a cavity.

28. The apparatus defined in claim 27 wherein an insulating layer is interposed between said segments to render said segments substantially acoustically uncoupled.

29. An apparatus for altering the physical properties of comestible materials, comprising:

a body member having a surface;

guides operatively connected to said body member for bringing a foodstuff in contact with said surface; and at least one sonotrode or piezoelectric element operatively connected to said body member for ultrasonically vibrating said surface with an energy sufficient to form a skin on said foodstuff.

30. The apparatus defined in claim 29 wherein said surface at least partially defines an aperture and said means for bringing comprises means for extruding said foodstuff through said aperture.

31. The apparatus defined in claim 30 wherein said aperture is tapered down from an inlet end to an outlet end for increasing back pressure during said extruding.

* * * * *